United States Patent [19]

Kohut

[11] Patent Number: 4,912,827
[45] Date of Patent: Apr. 3, 1990

[54] METHOD FOR REPLACING A DOOR PANEL

[76] Inventor: Frank R. Kohut, 107 Columbus St., Bloomfield, N.J. 07003

[21] Appl. No.: 248,452

[22] Filed: Sep. 23, 1988

[51] Int. Cl.[4] ............................................. B23P 19/04
[52] U.S. Cl. .............................. 29/402.13; 29/402.03; 29/403.08; 29/426.4
[58] Field of Search ........... 29/402.03, 402.08, 402.13, 29/426.4; 49/502

[56] References Cited

U.S. PATENT DOCUMENTS

| | | |
|---|---|---|
| 2,288,577 | 6/1942 | Trautvetter ............................ 49/502 |
| 2,660,470 | 11/1953 | Nelson .................................. 49/502 |
| 4,520,564 | 6/1985 | Wivinis ................................. 30/168 |

Primary Examiner—Tiomothy V. Eley
Assistant Examiner—Frances Chin
Attorney, Agent, or Firm—Blum Kaplan

[57] ABSTRACT

A method for replacing an automobile door panel without removing the door from the automobile utilizing a crimping tool is provided. The mirror is removed from the door. An inner section of the damaged door panel is cut out leaving a border around the door frame. The cut out inner section is removed and the handle and lock cylinder on the door are also removed. A plurality of relief cuts are made about the front, bottom and rear surfaces of the border remaining on the door frame. The border is then peeled away from the door frame. A new panel is placed around the front edge of the door frame holding the back end out. The panel is then pushed in and around the remainder of the door frame. The back and the bottom edges of the new panel are then crimped with a hammer and dolly block and the front edge of the door panel is crimped about the door frame with a tool having a dolly block and a guide formed therein, a handle mounted on the dolly block, a pad mounted on the dolly block and a crimper slidably disposed within the guide. The remaining edges of the panel are then welded.

5 Claims, 2 Drawing Sheets

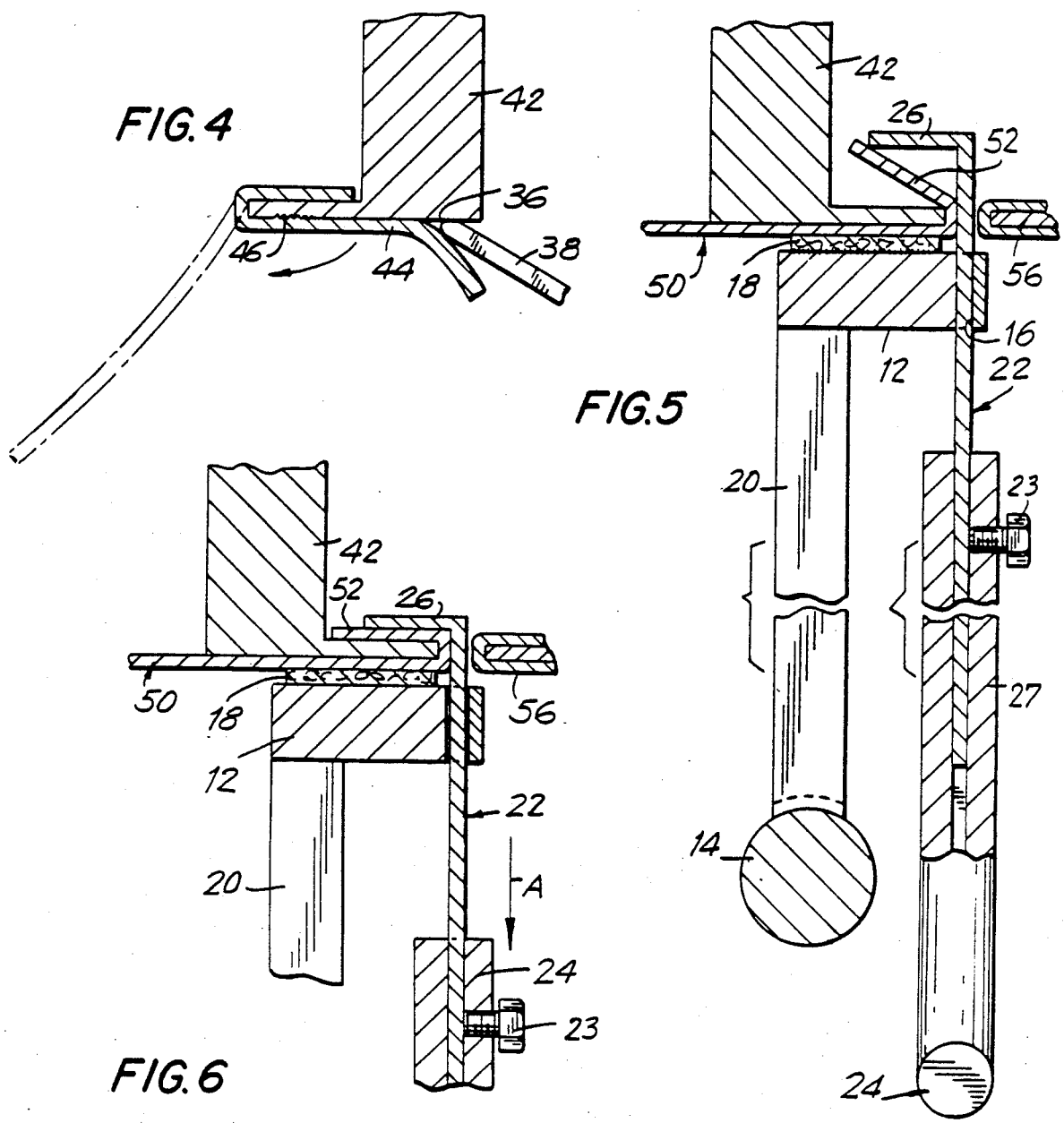

METHOD FOR REPLACING A DOOR PANEL

BACKGROUND OF THE INVENTION

This invention is directed to an apparatus for replacing a door panel on an automobile door and a method for replacing the door panel utilizing the apparatus, and in particular, an apparatus and method for replacing a door panel without removing the door.

Door panels are conventionally replaced by removing the entire door including the panel nd frame and removing the panel after the door has been removed from the automobile. This method of door panel replacement has been less than satisfactory. Removing a door panel with conventional tools in a conventional manner requires an extra amount of time to remove the entire door and replace the entire door after the door panel has been replaced. Furthermore, upon replacing the door, the door must be realigned with the automobile again requiring additional time and often resulting in less than perfect alignment making opening and closing of the door more difficult.

Accordingly, it is desired to provide a method for replacing a door panel without removing the door from the automobile and a tool for allowing such a method to be accomplished.

SUMMARY OF THE INVENTION

Generally, a tool for replacing a door panel without necessitating the removal of the door from the automobile and a method for utilizing the tool is provided. The tool includes a dolly block having a slot therein. A dolly block handle is mounted on the dolly block at one surface. A cushioning pad for coming in contact with the door panel is also provided on the dolly block. A crimper extends through the slot and is slidably positioned therein. A slide handle is affixed to the crimper to aid in positioning the crimper during crimping of the door panel.

A peel away tool may be utilized to peel away the door panel from the door frame. The tool includes a handle section affixed to the top portion of a shaft. A blade section having a planar surface substantially thinner than the shaft and a blunt front edge extends from the shaft.

The door panel is replaced by first removing the mirror and removing the door belt molding. An inner section of the damaged door panel is cut away from the door leaving a two inch border about the door circumference. The handle and lock cylinder are removed. Relief cuts, approximately three inches apart, are made around the front, bottom and rear sections of the remaining border. The peeling tool is utilized to remove the old door panel border from the door frame by wedging the blunted front edge between the door frame and door panel. The new panel is prepared to be placed on the frame. The new panel is installed around the front edge of the door frame holding the back end out. The panel is then pushed in around the door frame. The back and bottom edges of the new panel are crimped and the door is closed to check alignment. When the panel is aligned the panel is spot welded in the rear and bottom to hold the panel in the aligned position. The crimper is then slid between the open door and front fender. The door is then closed and the front edge of the door panel is crimped using the crimping tool. The mirror and belt molding are then reinstalled to complete replacement.

Accordingly, it is an object of the invention to provide an improved tool for replacing door panels.

Yet another object of the invention is to provide a method for replacing door panels which does not necessitate the removal of the entire door during the replacement method.

Still another object of the instant invention is to provide a tool for replacing a door panel and a method for utilizing the tool which reduces the time required to replace a door panel.

A further object of the instant invention is to provide a door panel replacement tool and door panel replacement method which removes the need to realign the door with the car during replacement.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a front elevational view of the damaged door panel during an intermediate step of the process for replacing the door panel;

FIG. 4 is a sectional view along line 4—4 of FIG. 3 of the damaged door panel being peeled by the peeling tool;

FIG. 5 is a sectional view of the new door panel being crimped by the door panel edge crimper; and FIG. 6 is a sectional view of the new door panel after crimping by the door panel edge crimper has been completed.

DETAILED DESCRIPTION OF THE PREFERRED EMBODIMENTS

Figure 1:
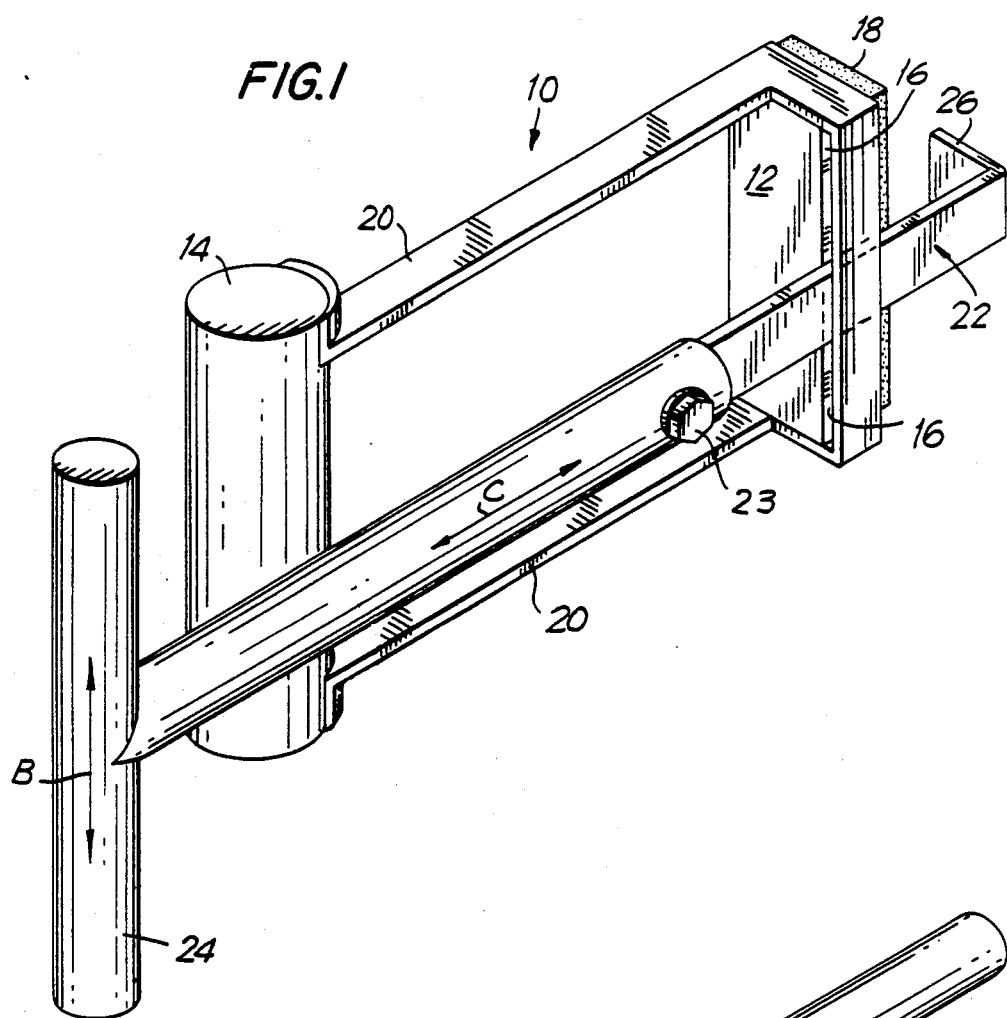
FIG. 1 is a perspective view of a door panel edge crimper constructed in accordance with the invention.

Reference is made to FIG. 1 wherein a door panel edge crimper, generally indicated at 10, constructed in accordance with the invention is provided. Door panel edge crimper 10 includes a dolly block 12 having a slot 16 formed therein. A handle 14 is affixed to dolly block 12 in spaced relation by support arms 20 located at either side of dolly block 12. A pad 18 is provided on dolly block 12 so that when dolly block 12 comes in contact with an automobile, the pressures exerted by dolly block 12 does not deform the door panel being worked upon. Pad 18 may be made of leather or some other cushioning material.

A crimper 22 is slidably disposed within slot 16 so that slot 16 acts as a guide for crimper 22. Crimper 22 moves in the direction of arrows C. A slide handle 24 is affixed at the noncrimping end of crimper 22 by a screw 23 to provide leverage during crimping and aid in the manipulation of crimper 22. Crimper 22 includes a crimping end 26 which includes a solid rigid piece made out of a metal or the like formed as a right angled corner.

Reference is made to FIGS. 5 and 6 wherein the operation of crimper 10 is depicted. During crimping, dolly block 12 is positioned against a new door panel 50 being installed adjacent to the edge of the door panel being crimped about a door frame 42. For example, when crimping the front edge of front door panel 50, crimper 22 is slid between the open door and the adjacent door surface; such as the rear of a fender 56. Slide handle 24 is then pulled causing crimper 22 to move towards dolly block 12 in the direction of arrow A crimping the new panel 50 about door frame 42. Contours can also be crimped by angling the action of slide handle 24 in the direction of arrows B. Crimping end 26 is dimensioned to crimp a three inch area during each crimping action. Dolly block 12 is then moved to the next three inch area to be crimped.

Figure 2:
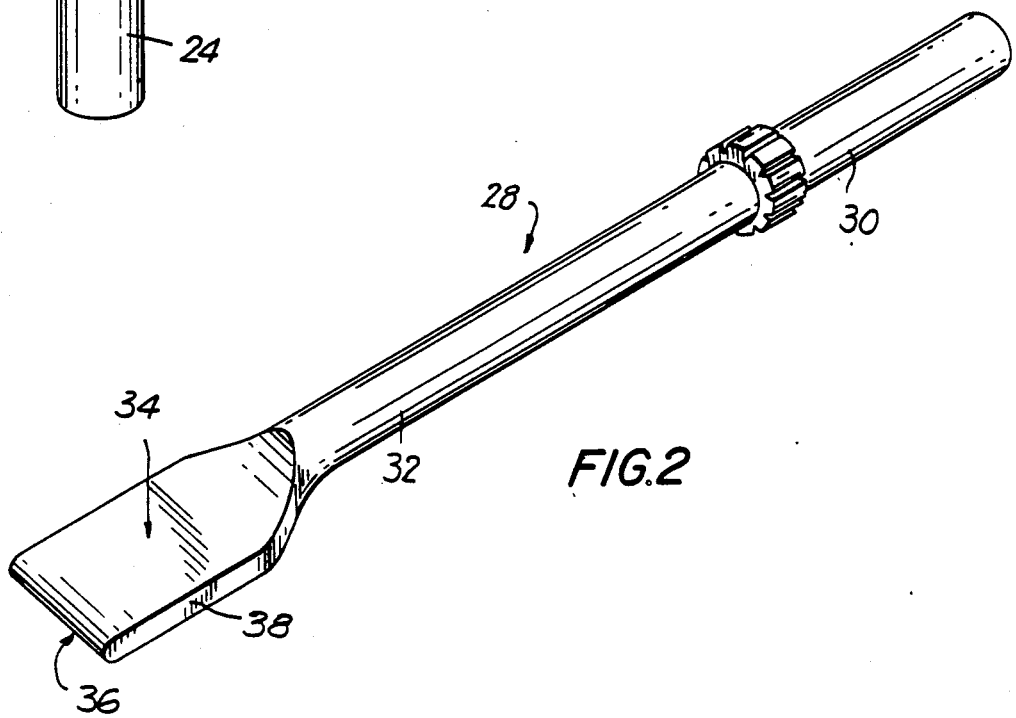
FIG. 2 is a perspective view of a peeling tool constructed in accordance with the invention.

Reference is now made to FIG. 2 in which a peeling tool, generally indicated at 28, constructed in accordance with the invention is provided. Peeling tool 28 includes a handle portion 30 A shaft portion 32 extends from handle portion 30. A blade portion 34 extends from handle 32 and includes a substantially planar section 38 having a width substantially smaller than handle 32 and a blunt front edge 36.

Peel away tool 28 is utilized to remove the remaining border of the door frame once the door panel has been cut away from the border during removal of the door panel. As seen in FIG. 4, blunt edge 36 of blade portion 34 is wedged between door frame 42 and the remaining border 44 of the old panel. Handle 30 of tool 28 is then used as a lever causing peel away tool 28 to break the welds 46 attaching the old panel to door frame 42 separating remaining panel border 44 from door frame 42.

A complete method for replacing a door frame utilizing door panel edge crimper 10 and peel away tool 28 is now detailed below. First, the mirror is removed. If the mirror is a cable remote control mirror, then the interior trim must be removed before removing the mirror. However, if the mirror is electrically remote controlled and the connection is adjacent the mirror mount, then the mirror is merely removed and unplugged. The interior door trim does not need to be removed. The door belt molding located above the door adjacent the glass pane is then removed. If the molding is held only by plastic clips, then the molding is directly removed. However, if the molding is held by screws that are screwed into the door panel upper edge, the molding is left on. The molding is later trimmed off when trimming away the upper edge of the remaining border of the panel and then unscrewed, as will be described in greater detail below. If the belt molding is screwed through the door panel into a permanent reenforcement door, the door interior trim must be removed and the door glass either dropped down out of the way or removed in order to remove the belt molding.

The damaged door panel is then trimmed by first cutting out an inner section of the damaged door panel leaving about a two inch border 44 remaining that extends about the outer edges of door frame 42. The cutout inner section is then carefully pulled away from the door frame with one hand leaving the other hand free to disconnect the rods which connect the door handle and lock cylinder to the door. Thus a two inch border 44 is left formed of the remnants of the damaged door panel with a hole therein formed by the removal of the damaged door which has been cut away. The cutout section is completely removed with the handle and lock cylinder attached. The handle and lock cylinder are detached from the old door panel and saved for the new panel. Cutting away the old door, provides access to previously hard to reach areas allowing a mechanic to work on the door frame without removing the door frame by working from the inside of the door and beneath the door panel through the access obtained by the cutout area.

Next, as shown in FIG. 3, relief cuts 62 spaced approximately three inches apart are made around the front, bottom and rear edges of the two inch border 44 remaining on door frame 42 from the old panel. A standard forked air chisel is used to perform this function. As shown in FIG. 4, using peel away tool 28, blunt front edge 36 is forced between old door panel border 44 and door frame 42. With the aid of the relief cuts, the old door panel is peeled away from door frame 42, breaking spot welds 46 attaching the old door panel to door frame 42. The three inch spaced cuts 62 relieve the pressure of the entire weld by limiting the attachment force of the border to each individual spot weld 46 rather than to the force of all the spot welds acting in unison upon the entire strip. This peeling process is performed around the entire door edge and is particularly suited for removing the section of the old door panel which is next to the fender where there is very little room to work. The peeled away door sections adjacent the front fender may be cut away and dropped into the door bottom. The dropped pieces may then be removed by pliers. Once the entire door panel border has been removed the door frame edge is ready to be shaped and aligned to the front fender and the rear quarter panel or door.

To install the new panel, the new panel is first prepared. The inside of the panel is grounded and a thin coat of body filler is applied to act as a sound barrier. The panel is sanded and primed and the body color is dusted in around the handle and lock cylinder areas. The door handle and lock cylinder are then installed on the panel. The lip of the front edge of the new panel is molded from a 90° angle to approximately a 30° angle or less with a body hammer.

The screws holding the bottom of the front fender back edge are removed. The fender is kept out by wedging a two-by-four between the rocker and the fender bottom. This permits more room to install the new panel in and around the front of the door frame. The new panel is installed around the front edge of the door frame, while the back is held out, to catch the rods to the door handle and lock cylinder. The panel is then pushed in around the remainder of the door frame.

The back and bottom edges of the new panel are crimped with a hammer and dolly block. The two-by-four is removed and the fender bottom is reinstalled. The door is closed and the panel is checked for alignment. When the panel is aligned, several areas of the door panel are spot welded in the rear and bottom to hold the panel in the aligned position.

As depicted in FIGS. 5 and 6, the front edge of the new door panel 50 is then crimped, utilizing door panel edge crimper 10. Crimper 26 is then slid between the open door and the rear of the front fender. The door is closed. The front edge of the door panel is crimped by positioning crimper portion 26 about an edge 52 of new panel 50 to be crimped about door frame 42. By pulling slide handle 24 away from the door crimper 22 bends edge 52 about door frame 42 affixing new panel 50 to door frame 42. On cars where the hinge of the door is too close to the door panel edge, a crimper is used in a wedging action between the panel and hinge.

The remaining parts of the door panel are then welded. The inner edge of the panel is sanded and primed and then a seam seal is applied. The mirror, belt molding and interior trim are then installed completing panel replacement.

It will thus be seen that the objects set forth above, among those made apparent from the preceding description are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for replacing a damaged automobile door panel secured to an automobile door frame that is in turn secured to an automobile frame without removing the door frame from the automobile frame, the door frame including a handle, a lock cylinder and a mirror and comprising the steps of removing the mirror, cutting out an inner section of the damaged door panel so that a border remains around the front, rear, top and bottom of the door frame, removing the cut out inner section, removing the handle and the lock cylinder from the door frame, making a plurality of relief cuts in the border at the front bottom and rear of the border, peeling away the border from the door frame, placing a new panel around a front edge of the door frame holding a back end of the new panel out from the door frame, pushing the panel in and around the door frame, crimping a back edge and a bottom edge of the new panel with a hammer and dolly block, crimping the front edge of the new door panel about and door frame by sliding a front edge crimping tool between the door and rear of the fender, and welding the remaining edge of the new door panel.

2. The method of claim 1, wherein the border is peeled away from the door frame utilizing a peel away tool having a blunted front edge.

3. The method of claim 1, further including the steps of preparing the new panel for installation.

4. The method of claim 5, wherein preparing the new panel for installation includes bonding an inside surface of the new panel and applying a thin coat of body filler, sanding and priming the new panel, and changing the angle of the front edge of the new panel from a 90° angle to approximately a 30° angle or less.

5. The method of claim 1, wherein the crimping tool includes a dolly block having a guide formed therein, a handle mounted on said dolly block, a pad mounted on said dolly block, and crimping means positioned within said guide for crimping a door panel when said pad comes in contact with a door panel adjacent to an edge to be crimped.

* * * * *